(No Model.) 3 Sheets—Sheet 1.

L. C. CUMMINS.
TELESCOPIC RIFLE SIGHT.

No. 476,874. Patented June 14, 1892.

WITNESSES:
E. M. Bruce.
E. R. Plaisted.

INVENTOR
Lawson Cutler Cummins

THE NORRIS PETERS CO., PHOTO-LITHO., WASHINGTON, D. C.

(No Model.)  3 Sheets—Sheet 2.

L. C. CUMMINS.
TELESCOPIC RIFLE SIGHT.

No. 476,874.  Patented June 14, 1892.

WITNESSES:
E. R. Plaisted
C. P. Pitkin

INVENTOR
Lawson Cutler Cummins (No Model.) 3 Sheets—Sheet 3.
L. C. CUMMINS.
TELESCOPIC RIFLE SIGHT.
No. 476,874. Patented June 14, 1892.
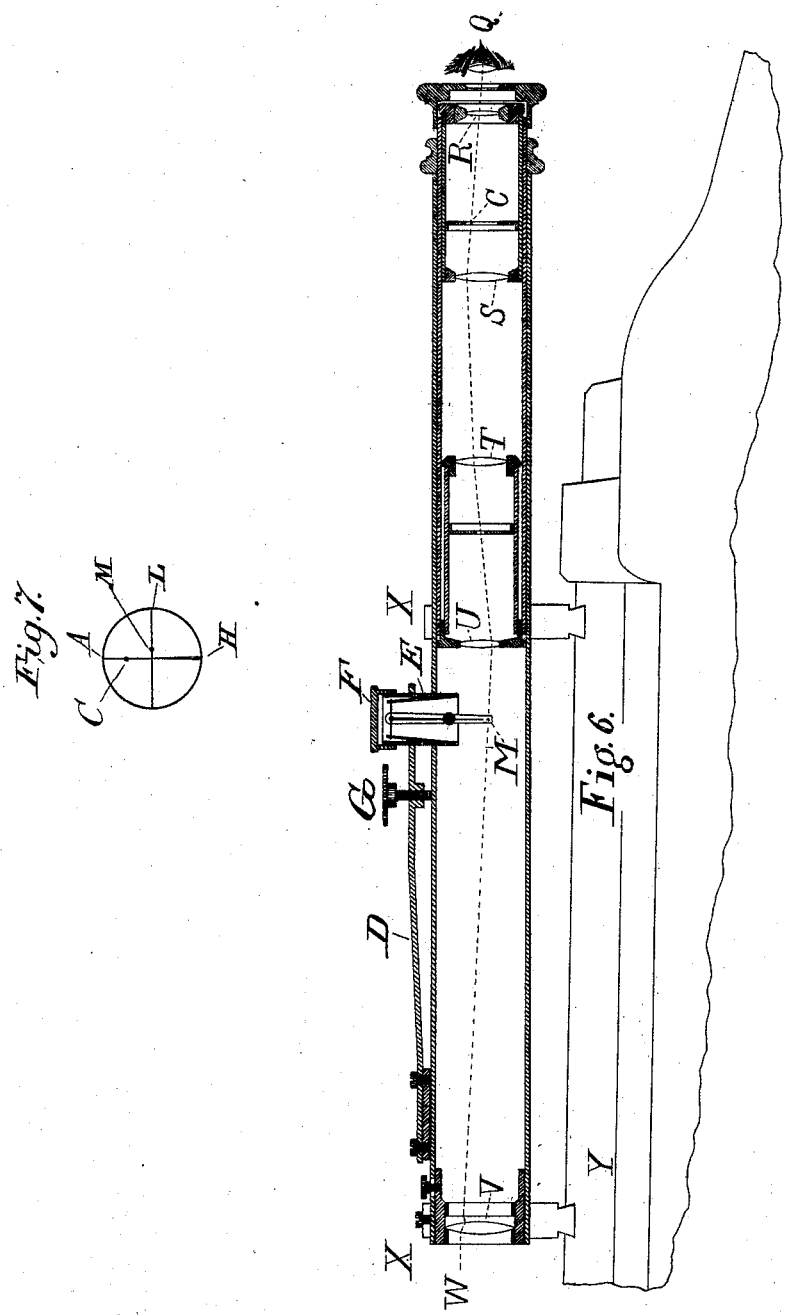
WITNESSES: INVENTOR.

UNITED STATES PATENT OFFICE.

LAWSON CUTLER CUMMINS, OF MONTPELIER, VERMONT.

TELESCOPIC RIFLE-SIGHT.

SPECIFICATION forming part of Letters Patent No. 476,874, dated June 14, 1892.

Application filed April 30, 1891. Serial No. 391,164. (No model.)

*To all whom it may concern:*

Be it known that I, LAWSON CUTLER CUMMINS, a citizen of the United States, residing at Montpelier, in the county of Washington and State of Vermont, have invented a new and useful Rifle Telescope-Sight, of which the following is a specification.

My invention relates to improvements in telescope-sights for rifles; and the object of my improvements is to provide sights that while aligned with the target shall enable the marksman to point the bore of the rifle at or above or to the right or left of the target and at all times show through the lens of the telescope to what point the bore of the rifle is aimed. I attain these objects by the mechanism illustrated in the accompanying drawings, in which is represented, by—

Figure 3:
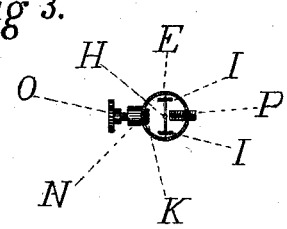
Figure 2:
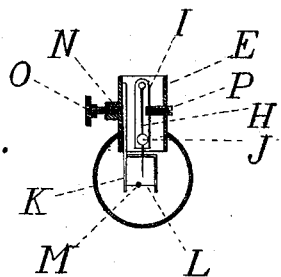
Figure 1:
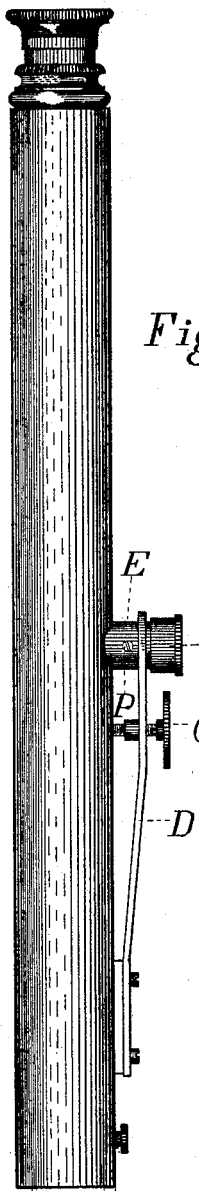
Figure 4:
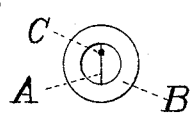
Figure 5:
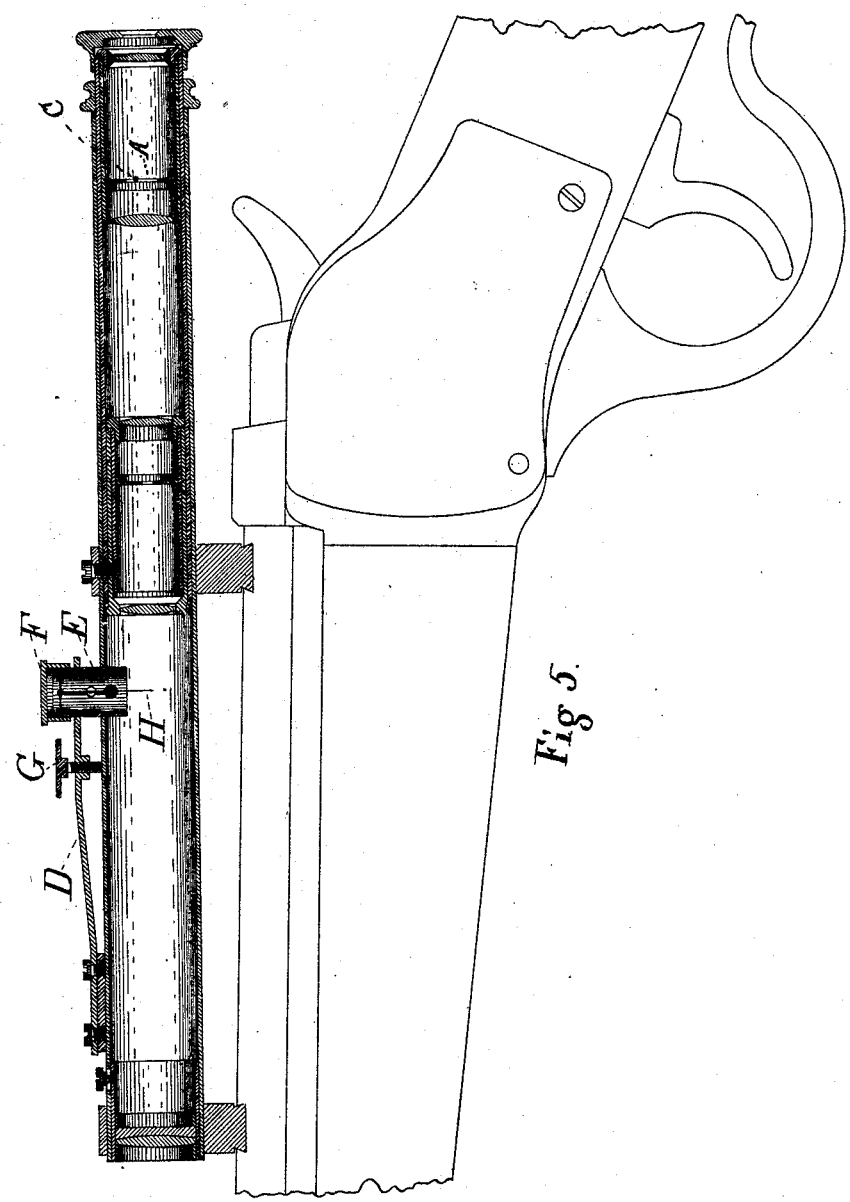

Figure 1, a view of a rifle-telescope with this improvement attached; Fig. 2, a section of tube E and contents; Fig. 3, a plan of outer end of tube E and contents; Fig. 4, the diaphragm and its attachments located at the focus of the eye-lens. Fig. 5 is a vertical longitudinal section of my telescopic sight shown mounted on a rifle. Fig. 6 is a section of telescope-tube and method of attaching the same to the rifle-barrel, the lenses, the sight-points, and the course of a ray of light from the foremost lens through the remaining lenses to the eye. Fig. 7 illustrates the line of sight from the eye through the telescope.

Similar letters refer to similar parts throughout the several views.

A fiber of silk A is drawn perpendicularly across the center of the diphragm B, which is placed in the focus of the eye-lens. Upon this silk line, and slightly above its center, is placed a small globule of balsam C. A hole is bored in the tube of the telescope over the focus of the object-glass, the diameter of the hole being equal to the width of the pencil of rays at that point. To the tube of the telescope a spring D is attached. This spring overlaps the hole in the telescope-tube and has a similar perforation, in which is soldered a tube E, the lower end of which enters the hole in the telescope-tube, the upper end being fitted with a cap F. The spring D is supplied with a thumb-screw G, by means of which it is raised or lowered. Within the tube E, in its center, is pivoted a steel needle H, with arms extending parallel to the telescope-tube and resting on upright supports I I, fastened at lower end of tube E. This needle has a small leaden weight J attached to it midway between the point and pivoting-arms. To the inside of the tube E, at its upper edge and midway between the points where the arms of the needle H are pivoted, a flat steel spring K is attached. This spring extends through the tube E and at the lower end of the tube E becomes forked, one fork of which is bent nearly at a right angle and passes across the mouth of the tube E, where it is bent downward. The other fork continues from the mouth of the tube E downward. The length of these forks is sufficient to reach to the lower edge of the pencil of light at that point. The points of these two forks are connected by a fiber of silk L, colored black. Upon this fiber of silk, nearly midway between the points of the two forks, but slightly nearest the fork which is not bent, is placed a globule of balsam M. Into the side of the tube E, between the spring D and the telescope-tube, is screwed and soldered a shank N with a threaded hole, the inner opening of which is directly against the spring K. In this hole is fitted a thumb-screw O. In the tube E, directly opposite the shank N, is placed a set-screw P to regulate the vibrations of the needle H. By means of the thumb-screws G and P the globe M is aligned with the globe C.

The telescope-tube is rigidly attached to the rifle-barrel in such a position that the alignment of the two globes will be parallel to the longitudinal axis of the bore of the rifle. The rifle is now held so that the perpendicular line A exactly corresponds with a plumb-line in front of the telescope, and while so held the supports I I of the needle H are so arranged that the point of the needle shall be exactly above the globe M, the image being carried to the eye in an inverted form. The globe M is aligned with the target, and the globe C indicates the point at which the bore of the rifle is aimed, the relative position of the globes being controlled by the thumb-screws G and P and needle H. A ray of light entering the object-lens V at the point indicated by the dotted line W is by the object-lens V refracted to the lens U. The position of the movable globe M is represented as being coincident with this line of refraction. When this ray of light passes through the lens U, it is again refracted, as shown by the continuance of the dotted line W, to the lens T. In passing through the lens T its course is again modified until it reaches the lens S, which again changes the angle of its direction to the eye-lens R. The position of the fixed globe C is represented as being coincident with this line of refraction. The ray of light now passes through the eye-lens R and meets the eye Q. The method of attaching the telescope to the rifle-barrel Y by two rings X X with dovetailed bases set in the rifle-barrel Y is also shown in Fig. 6.

What I claim as my invention, and desire to secure by Letters Patent, is—

The combination, in a rifle telescope-sight, of a fixed perpendicular line A, with globe C on its upper part, placed in the focus of the eye-lens, with a pivoted needle H, aligned with it in the focus of the object-lens, and a movable horizontal line L, with globe M attached, placed in the focus of the object-lens and rendered adjustable in any direction by means of the needle H and springs D and K, and thumb-screws G and P, all substantially as set forth.

LAWSON CUTLER CUMMINS.

Witnesses:
E. M. BRUCE,
LEIGHTON P. SLACK.